Jan. 3, 1961 D. P. HART 2,967,161
INTERPOLYMER OF ALLYLEPOXY RESIN AND POLYAMIDE RESIN
Filed March 27, 1956

INVENTOR.
DONALD P. HART
BY
*Oscar L. Spencer*
ATTORNEY

United States Patent Office 2,967,161
Patented Jan. 3, 1961

2,967,161

INTERPOLYMER OF ALLYLEPOXY RESIN AND POLYAMIDE RESIN

Donald P. Hart, Allison Park, Pa., assignor to Pittsburgh Plate Glass Company, Allegheny County, Pa., a corporation of Pennsylvania Filed Mar. 27, 1956, Ser. No. 574,279

4 Claims. (Cl. 260—18)

This invention relates to a thermosetting system containing an interpolymer of an epoxy polyether resin, and a polyamide resin. The invention has particular relation to a system of the foregoing type which has outstanding value as a coating agent or bonding agent for various highly exacting applications especially in the container field or in the caulking field.

It has heretofore been recognized that valuable resins termed polyether or epoxy resins useful for many applications in the coating art could be prepared by reaction of polyhydric phenols such as bisphenol and epichlorohydrin in the presence of an alkaline agent such as sodium hydroxide. These are termed polyether or epoxy resins. It has also been recognized that valuable resins could be prepared by appropriate condensation or esterification of long chain dicarboxylic acids and diamines.

It has further been recognized that polyamide resins could be blended with or interpolymerized with polyether resins. The foregoing resins were valuable for many applications. However, for certain exacting applications such as for the coating or the seaming of such containers as sheet metal food containers, they were not entirely satisfactory. In particular, they often tend to be low in flexibility and elongation. This was especially true in those instances where the material was to be used for such uses as a cement for seams of containers or as a caulking compound, where they might often be subjected to a high degree of distortion.

This invention comprises the discovery that valuable resin products may be obtained by mixing and reacting together a liquid polyether type resin containing aromatic groups with unsaturated aliphatic side chains, and a liquid polyamide type resin. In many instances, the resultant products are capable of curing to a state in which they possess exceptionally high elongation, flexibility, exceptionally high mechanical strength, unusually good adherence to many metals such as aluminum, iron or steel, or to wood or plastics or to heterogeneous systems of two or more of these. They are also heat resistant, are inert with respect to most chemicals and are highly insoluble in most solvents. They also possess little or no odor and are substantially tasteless. Some or all of these properties are highly desirable in such exacting uses as in cements for the seams of containers for food products, chemical solvents and many other applications and in caulking compounds. Needless to say, these are among the more exacting applications and are emphasized at this time for that reason. Obviously, the materials are useful for many other less exacting applications as a matter of course.

The present invention, however, more particularly comprises the use of liquid epoxy or polyether resins containing allylic groups as pendant chains. The improved interpolymer resin of this invention containing a polyether type resin with reactive allyl groups, may conveniently be obtained by combination of a polyamide resin with a polyether resin which is produced by reacting a compound of the type epichlorohydrin with a compound of the type 2,2-bis(4-hydroxy-3-allylphenyl)-propane in the presence of an alkaline material. The preparation of such epoxy resins is elaborated upon in a copending application to Roger M. Christenson and William C. Bean, Serial Number 471,494, filed November 26, 1954. Examples illustrating the preparation of such preferred polyether resin will subsequently be included.

More desirable polyamide resins suitable for blending with the polyether components usually comprise the liquid reaction products of di- or triamines and such long chain dicarboxylic acids as the so-called dimer acids which are also termed "polymeric fat acids" obtained by addition reaction of such glyceride drying oil acids as those of linseed oil, soya bean oil and the like. These polyamides are disclosed in U.S. Patents: 2,462,053, 2,695,908, 2,705,233, 2,707,708, and others. The dimer acids in polyamides may be replaced by other long chain acids containing 20 or more carbon atoms in the chain interconnecting the carboxyls, but acids such as dimer acids containing ethylenic groups are preferred. The liquid polyamides or polyamides which are soluble in appropriate solvents are particularly desirable for use in the practice of the invention. The polyamides, in addition to being liquid or at least soluble, should also contain an excess of $$-\underset{\mathrm{H}}{\mathrm{N}}- \text{ or } NH_2$$

groups containing active hydrogen and being adapted to react with the epoxy resin. The available groups may be provided by incorporation of an excess of a diamine or by use of a triamine or even a higher amine containing an excess of available —$NH_2$ groups.

In the foregoing mixtures, a portion, e.g. 5 to 75 percent, of the epoxy resin containing allyl groups may be replaced by other epoxy resins which are free of allyl groups and being represented by the polyether obtained by reacting 2,2-bis(4-hydroxyphenyl)propane and epichlorohydrin and an alkali. The added epoxy resins may be selected from those described in the above listed patents. When such epoxy resins are substituted for a portion of the allyl epoxy resin, the flexibility of the cured product is decreased.

Various relative proportions of polyether resins and the polyamide resins may be employed in making up the thermoset resin. The following are approximate ranges of proportions which may be utilized:

Parts by weight

Liquid polyether resins containing at least some
 allyl groups _____ 5
Liquid polyamide resin _____ 1 to 10

The foregoing components may be mixed together merely by agitation. After all components are mixed, it is usually preferable to apply and cure the mixture within a few hours or before the liquid mixture can set prematurely.

Interpolymerization of the liquid mixture to form a solid, thermoset resin will often proceed relatively rapidly even at room temperature or below and will proceed to completion at 60° C. or above in a matter of a few minutes. At 180° C. or above, it often proceeds to completion in a matter of a few seconds. The preparation of allyl epoxy resins suitable for mixing and curing with polyamides is described in the aforementioned application to Christenson and Bean. The following example illustrates the preparation of this material upon a commercial scale.

*Example A*

A solution is prepared comprising 4.4 pounds of sodium hydroxide dissolved in 27.8 pounds of water. To this solution is added 12.7 pounds of 2,2-bis(4-hydroxyphenyl)propane known under the trade name of Bisphenol A. The mixture also includes 25 grams of $Na_2S_2O_4$. The mixture tends to heat up exothermically and is cooled to 100° F.; to the mixture then is added 8.9 pounds of allyl chloride and the mixture is refluxed for 1 hour at 212° F. The mixture is cooled and acidified with phosphoric acid and the water layer is decanted off. The resultant product is 2,2-bis(allyloxyphenyl)propane. This product is rearranged to form the desired 2,2-bis(4-hydroxy-3-allylphenyl)propane as follows:

A mixture is prepared comprising 108.2 pounds of the indicated allyloxyphenyl propane and 21 pounds of xylene. This mixture is heated with azeotropic distillation of water. The dried mixture is then neutralized with sodium carbonate and is refluxed for 7 hours at 355° F. The product is 2,2-bis(4-hydroxy-3-allylphenyl)propane.

In order to form the polyether or epoxy resin suitable to receive additions of polyamides, the 2,2-bis(4-hydroxy-3-allylphenyl)propane as thus obtained and in an amount of 14.6 pounds is incorporated with 29 pounds of epichlorohydrin. To the mixture is added 638 grams of water and 296 grams of sodium hydroxide. The mixture is heated to 165° F. and the temperature subsequently rises exothermically to 200° F. to 210° F. The addition of water and sodium hydroxide is repeated three times. The mixture is refluxed for 1 hour and is washed with 19 pounds of water. The water layer is removed and the polyether of 2,2 - bis(4-hydroxy-3-allylphenyl)propane and epichlorohydrin is distilled under vacuum and then is filtered.

The product obtained has an epoxy equivalent weight of about 300, a viscosity of Y to Z on the Gardner scale and is of a solids content of 96 to 100 percent. This polyether or epoxy resin is excellently adapted for mixing with polyamides as already described to provide a product which cures within a few hours even at room temperature and which is valuable as a coating agent, a caulking compound or seam cement for sheet metal containers and for many other applications.

The blending and curing of this liquid resin with a polyamide resin is illustrated by the following example:

*Example 1*

In this example, the polyether resin corresponds to that described in Example A. The polyamide employed as a modifier of the polyether is a liquid commercial product sold by by the General Mills Corporation called Versamid 115. This is understood to be the polyamide of dilinoleic acid (a dimer acid), and ethylene diamine probably with other amines such as tertiary amines, e.g. ethylene triamine, and contains active free amine groups. The molecular weight is understood to be in a range of about 3,000 to 10,000.

An interpolymerizable mixture is prepared comprising:

Parts by weight
Allyl epoxy resin (Example A) _____ 60
Polyamide resin (Versamid 115) _____ 100

The mixture has a pot life of about 2 hours at 100° F. It can be spread upon metals, wood, plastics and the like or combinations of such materials and cured by aging to a highly tough, flexible, shear resistant and adherent state, adapting it for use as a seam cement in containers and many other articles in place of metallic solders. It is also useful as a coating for protection of the coated surface against weathering, solvents, or chemical reaction.

In order to test the efficacy of the above described mixture as a cement or bonding agent between two surfaces of sheet steel of the type employed in the construction of tin cans and similar sheet metal containers, two strips of the metal about 4 to 6 inches in length and 1 inch wide are coated for a distance of 1½ to 2 inches with the liquid composition and then are lightly pressed together so that the coated portions are superposed. Heat of a hot plate may be applied for 10 to 12 seconds in order to effect a cure to thermoset state. The test samples are then cooled.

To give the samples a peel test, the two unbonded ends of the strips are held in an appropriate tensioning device and the ends while spread apart at an angle of 180°, are pulled apart at a steady rate of 8 inches per minute. The average pull required to peel the two pieces of metal apart is determined. The mixture of this example when subjected to the foregoing test has been found to exhibit a peel strength of 27 to 32 pounds. The bond is strong and this property along with the other properties of the material adapts it for use as a container seam cement or as a container coating.

In order to determine elongation of the material, two pieces of wood (e.g. yellow pine) 1 inch by 2 inches in section are bonded together end-to-end with a ¼ inch layer of the mixture in the joint. The test essentially corresponds to that of A.S.T.M. 897–49.

The test sample containing the foregoing mixture, after curing for 24 hours at room temperature, gives an elongation of 175 percent. The mixture is well adapted for use as a caulking compound in ship decking.

In the preceding example, the use of 2,2-bis(4-hydroxy-3-allylphenyl)propane as the polyhydric phenol portion of the polyether resin component has been indicated. It is to be understood that this compound may be replaced by other gem-di(hydroxy-3-allylphenyl)alkanes containing 1 or more allyl groups, or similar unsaturated side chains in the benzene rings, and in which the alkane group contains from 2 to 4 carbon atoms in a straight chain.

Examples of gem-di(4-hydroxyphenyl)alkanes which may be reacted with allyl chloride to provide such gem-di(hydroxy-3-allylphenyl)alkanes comprise:

1,1-bis(4-hydroxyphenyl)propane
1,1-bis(4-hydroxyphenyl)ethane
1,1-bis(4-hydroxyphenyl)butane
2,2-bis(4-hydroxyphenyl)butane
2,2-bis(4-hydroxyphenyl)propane
2,2-bis(4-hydroxy tertiary butyl phenyl)propane and various others. These phenolic compounds may be reacted with various halogenated epoxides, a representative partial list of these is as follows:

1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
2-chloro-2,3-epoxy octane
1-chloro-2-methyl-2,3-epoxy octane
1-chloro-2,3-epoxy decane and others. The techniques of forming the polyethers to form the foregoing materials substantially correspond to those already described or hereinafter described. These polyethers may be substituted for those disclosed in Example I.

The liquid mixtures of polyethers and polyamides as disclosed herein, are not limited in their application to use as cements for tin plates, but are also useful in cementing or bonding joints between contiguous surfaces of such metals as aluminum, brass, magnesium alloys and the like. Likewise, the mixtures may be employed as bonding agents between surfaces of wood, stone, plastic and other materials. As previously implied, it is also useful for bonding together unlike materials such as aluminum and plastics such as nylon, or iron and aluminum, or melamine resins and interpolymers of monomers containing $>C=CH_2$ groups and polyesters of dihydric alcohols and alpha-beta ethylenic dicarboxylic acids and many others.

The mixtures are further useful as coating agents for tin plate, aluminum, wood and other materials which it may be desired to protect or decorate by application of appropriate coatings. The mixtures may be applied to the surfaces to be coated and then cured by appropriate exposure at room temperature or more elevated temperatures below the temperature of the decomposition of the resin components or their interpolymer products.

For a better understanding of the application of the invention in bonding the seams in such articles as containers, reference may now be had to the accompanying drawings in which like numerals refer to like parts throughout and in which.

Figure 1:
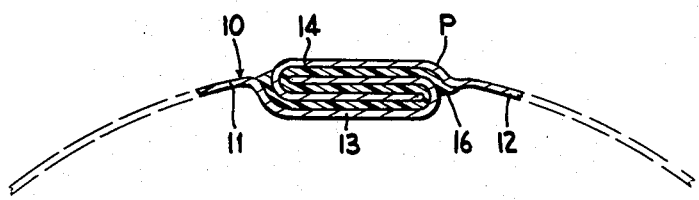
Fig. 1 is a fragmentary sectional view through a joint such as that between the edges of the walls of the tin plate in a conventional tin can or similar container.

In the drawings, the proportions do not necessarily correspond to those in an article actually embodying the invention but are intended merely for purposes of illustration.

In the embodiment of the invention as shown in Fig. 1, the walls of a container or a similar article are fragmentarily indicated at 10. These walls may be unitary, comprising a sheet of steel such as so-called tin plate with or without an actual surface coating of tin or other metal and being bent around in a circle, a square or other configuration so that the edge upon one side 11 is juxtaposed to the edge on the other side 12. The edge portions are bent to a crimped or hooked configuration as indicated at 13 and 14 and the hooked portions are interlocked in order to obtain a high degree of mechanical strength against bursting pressures even without the use of a cementing agent. In this construction, the interlocked surfaces are appropriately coated as at 16 and bonded together by a cementitious agent comprising a cured mixture of (1) a polyether resin and (2) a polyamide.

Figure 2:
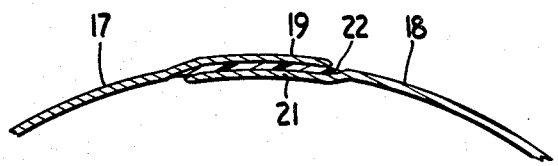
Fig. 2 is a fragmentary sectional view through a second type of joint between the edges of the metal constituting a container.

In the embodiment of the invention as disclosed in Fig. 2 of the drawings, portions 17 and 18 of sheet material such as sheet metal may be separate individual pieces of metal joined together or may comprise a single sheet of metal bent around to bring opposed edges into juxtaposed position. The edge portions, as indicated at 19 and 21, are overlapped and a thin, adherent layer of mixture of a polyether resin and a polyamide resin as indicated at 22 is interposed and cured to provide a strong, thermoset, resistant bond between the two edges. In the construction, the two edge portions, it will be observed, are merely overlapped without the actual mechanical crimping or hooking disclosed in Fig. 1. For many constructions, the mechanical resistance of this joint to tension or to other forces is quite adequate without actual crimping together of the edges.

In the embodiments of the invention as illustrated in Figs. 1 and 2, the compositions are indicated as constituting a so-called side seam cement. It is obvious that the use of the compositions of this invention are not limited to this particular application. They may for example, be employed in the joints between the bottom or top of a conventional tin can type container and the side walls. It is also manifest that the material as disclosed herein, may be employed as a bonding agent in the joints of the sheet metal employed in the construction of airplane wings, fuselages, and other portions of airplane construction or for the joints of boats, cars and many other articles. These are but illustrative uses. When the bonding agents herein disclosed are so employed, the joints may be further reinforced, if desired, by means of rivets or other conventional securing devices. These added securing devices usually are not required.

In forming the joints between the edges of a plurality of sheets of metal, or between a plurality of edges of the same sheet which is so bent that the edges to be bonded are juxtaposed, various techniques may be employed. Thus, those portions of a previously cut blank to be coated may first receive a layer of the liquid but thermosetting blend or mixture of the two resins. The coated portions to be cemented together may be brought together immediately or after a dwell affording time for partial cure of the mixture. The parts may be mechanically secured together as by hooking or crimping as in Fig. 1 or by other mechanical means. They may also be coated and merely overlapped as in Fig. 2. They may then be held together as by suitable clamping means until the mixture has cured to a hard, adherent and coherent state. The clamping means may then be released.

The application of the liquid cementing material may be by extrusion of a stream or jet upon the surfaces to be bonded together, or by roller coating, or by spraying, or by dipping the edges involved. It is within the purview of the invention to coat a large sheet or blank of material capable of forming a plurality of finished containers or other units, in an appropriate pattern and then to shear out individual blanks along the pattern of the coating. The edges to be secured are then brought together and the cementing mixture is cured, as for example by heating the container at a suitable temperature, e.g. 160° C. to 200° C. for an appropriate period of time, e.g. 6 to 20 seconds. The joints thus formed will resist the various operations involved in the processing of foods and beverages. Containers may be coated completely within and/or without with the foregoing resin. Coating may be performed upon a sheet of tin plate which is subsequently cut up and formed into containers; or the blanks may be coated before they are formed into containers. The formed containers may also be coated with the material. The high extensibility or flexibility of many of the thermoset compositions, coupled with the high cohesion and adhesion of the material is a great advantage in many processes of fabricating containers.

*Example II*

The allyl epoxy resin of Example A may also be mixed with an epoxy resin such as Epon 828 in a ratio represented by the table:

| | Parts by weight |
|---|---|
| Allyl epoxy resin (as per Example A) | 5 |
| Epoxy resin (e.g. Epon 828) | 1 to 15 (e.g. 5) |

The mixture can be spread and cured as in Example I.

The epoxy resin component may comprise epoxy resins which have been modified with various agents such as:

Styrene-oxide
Urea-formaldehyde resins
Phenol-formaldehyde resins
Melamine-formaldehyde resins
Phenyl-glycidyl ethers
Allyl-glycidyl ethers
Dibasic acids and anhydrides (phthalic anhydride, chlorendic anhydride)
Amines (e.g. ethylene diamine, diethylene triamine)

The modification may be in the allyl and/or non-allylic epoxy resin. The resins may be mixed and then treated with an agent from the above list, or they may be reacted with the modifier and then blended. These modified epoxy resins are then substituted for the epoxy of 2,2-bis(hydroxy-3-allylphenyl) propane of the preceding examples. A curing range of the mixtures of the epoxy resins and polyamide resins of about 150° C. to 200° C. is suggested.

I claim:

1. In a method of forming a novel, resinifiable mixture, the steps of mixing (A) a liquid epoxy resin of an epoxy equivalent weight of about 300 and resulting from the reaction of 2,2-bis(4-hydroxy-3-allylphenyl)propane with epichlorohydrin in the presence of sodium hydroxide, and (B) a liquid polyamide containing groups selected from the class consisting of —NH— and —NH$_2$, and being adapted to react with epoxy resins and being provided by reaction of an excess of an amine selected from the class consisting of aliphatic diamines and aliphatic triamines containing available —NH$_2$ groups, and a polymeric fat acid obtained by addition reaction of a glyceride drying oil acid, resin (B) being present in an amount of about 1 to about 10 parts by weight per 5 parts by weight of resin (A).

2. In a method of forming a novel, resinifiable mixture adapted to adhere to ferrous metals, the steps of mixing (A) a liquid epoxy resin containing 1,2-epoxy groups and resulting from the reaction of 2,2-bis(4-hydroxy-3-allylphenyl)propane with epichlorohydrin, the epichlorohydrin being in excess of equivalency with respect to the 2,2-bis(4-hydroxy-3-allylphenyl)propane in the presence of water and sodium hydroxide, and (B) a liquid polyamide resin containing groups containing active hydrogen and being selected from the class consisting of —NH— and —NH$_2$, and being adapted to react with epoxy groups, said polyamide resin being obtained by the reaction of (1) an amine selected from the class consisting of an aliphatic diamine and an aliphatic triamine containing available —NH$_2$ groups with (2) a polymeric fat acid resulting from the addition reaction of glyceride drying oil fat acids, resin (B) being present in an amount of about 1 to about 10 parts by weight per 5 parts by weight of resin (A).

3. In a method of forming a novel, resinifiable mixture, the steps of mixing (A) a liquid epoxy resin of an epoxy equivalent weight of about 300 and resulting from the reaction of a compound which is a gem-di(hydroxy-3-allylphenyl)alkane, in which the alkane moiety contains from 2 to 4 carbon atoms in a straight chain, with a halogen epoxide from the class consisting of:

1-chloro-2,3-epoxy propane
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy butane
1-bromo-4-ethyl-2,3-epoxy pentane
4-chloro-2-methyl-2,3-epoxy pentane
2-chloro-2,3-epoxy octane
1-chloro-2-methyl-2,3-epoxy octane
1-chloro-2,3-epoxy decane and (B) a polyamide resin containing available groups selected from the class consisting of —NH— and —NH$_2$, said polyamide resin being provided by the reaction of an excess of an amine selected from the class consisting of aliphatic diamines and aliphatic triamines containing terminal —NH$_2$ groups, with a polymeric fat acid resulting from the addition reaction of a fat acid of a glyceride drying oil.

4. The method of claim 1 in which the polyamine used to form the polyamide comprises a mixture of ethylene diamine and ethylene triamine.

References Cited in the file of this patent
UNITED STATES PATENTS

| | | |
|---|---|---|
| 1,993,254 | Booth | Mar. 5, 1935 |
| 2,423,869 | Blessing | July 15, 1947 |
| 2,440,339 | Langer | Apr. 27, 1948 |
| 2,464,753 | Shokal et al. | Mar. 15, 1949 |
| 2,510,727 | Sussenbach | June 6, 1950 |
| 2,682,490 | Gams et al. | June 29, 1954 |
| 2,705,223 | Renfrew et al. | Mar. 29, 1955 |
| 2,707,708 | Wittcoff | May 3, 1955 |
| 2,760,944 | Greenlee | Aug. 28, 1956 |

FOREIGN PATENTS

| | | |
|---|---|---|
| 629,111 | Great Britain | Sept. 13, 1949 |

OTHER REFERENCES

Lee at al.: "Epoxide Resins," p. 21, McGraw-Hill Book Co. Inc., N.Y., 1957.